Patented Feb. 16, 1926.

1,572,933

UNITED STATES PATENT OFFICE.

MAURICE KAHN, OF PARIS, FRANCE, ASSIGNOR TO SOCIÉTÉ FRANÇAISE DES PRODUITS ALIMENTAIRES AZOTÉS, OF PARIS, FRANCE.

PROCESS FOR THE MANUFACTURE OF CERTAIN ALBUMINS AND FATTY MATTERS.

No Drawing.   Application filed April 14, 1925.   Serial No. 23,146.

To all whom it may concern:

Be it known that I, MAURICE KAHN, residing at Paris, France, 7 Rue Pierre Nicole Prolongee, have invented certain new and useful Improvements in Processes for the Manufacture of Certain Albumins and Fatty Matters, of which the following is a specification.

Processes have long been known by which nitrogenous products and fatty matters have been extracted by autolysis heterolysis or auto-heterolysis, and such processes have been applied to products of animal origin and easily eliminable volatile antiseptics were added for the purpose of preventing putrefaction of the proteic substances during autolysis of heterolysis.

It has also been proposed to apply such processes to matters of vegetable origin.

Moreover, it was proposed in my former specifications Serial No. 724,539, and No. 724,540, both of July 5th, 1924, to employ a removable antiseptic or a mixture of removable antiseptics for this purpose.

The yield obtained, however, was not from a commercial point of view satisfactory whether one antiseptic or a mixture of antiseptics was employed. This deficient yield is apparently caused by putrefaction agents and when a single antiseptic is employed or a chance combination of antiseptics is employed a perfect mixture of antiseptics for acting upon the two classes of putrefaction agents of the different characters set out is not obtained.

This invention therefore has for its object to act in a more efficacious manner during the treatment of the vegetable or animal matters, both upon the aerobic and on the anaerobic bacteria.

According to this invention there is placed in action simultaneously during autolysis, heterolysis or auto-heterolysis of which one (or more) possesses a density relatively positive and one (or more) possesses a density relatively negative with respect to the density of the mass treated, others a lesser density than such mass with the result that the antiseptics are more equally distributed throughout the mass in digestion than when a single or several antiseptics each having more or less similar density with respect to that of the mass are employed or at least of the liquids which it contains.

Among antiseptics suitable for carrying out the general object of the present invention whose simultaneous use offers the maximum commercial advantages are toluene and chloroform.

By employing the process herein described the products produced by the process claimed in the former specifications herein set out are obtained, the methods of separation described in these specifications being employed.

The antiseptics used such as toluene and chloroform are easily removed from the nitrogeneous juices by evaporation in vacuo. They may however also be removed by leading a current of steam through the juices.

The following advantages are obtained by the simultaneous use of the two classes of antiseptics; in most cases no evolution of ammonia can be observed; there is practically no disamination as the action of disaminating ferments is prevented by the antiseptics; finally (and a very important point) yields are very much greater than those hitherto obtained when using a series of other antiseptics. Thus when applying this process to fish in place of obtaining a paste having 25% of water forming 10% of the weight of fish employed, yields of 20% and more will be obtained.

These excellent yields are explicable by the fact that the simultaneous use of these antiseptics in no way hinders the action of the proteolytic diastases but prevents all bacterial development and reduces to a minimum disamination caused by endocellular ferments.

As an example showing how such antiseptics may be employed simultaneously when treating fish:

Cut and crushed fish is added to 10 per thousand of its weight of chloroform and to 10 per thousand of its weight of toluene. The mixture is stirred. When the fish no longer contains a quantity of viscera sufficient to ensure the autodegredation of its albumins, a quantity of viscera equal to 2 to 10% of the weight of the fish is added. The temperature is maintained at 36° to 40° C. for about eight days. Autolysis is usually terminated within this period.

The process is then carried out as set out in the specifications above cited by classifying the products obtained by the operation and subsequently treating them to bring them into a commercial condition.

What I claim is:—

1. Process for obtaining certain albuminous and fatty matters from products of animal or vegetable origin which consists in adding simultaneously as antiseptics, for preventing multiplication to the mass undergoing digestion, non-miscible antiseptics of which one or more possess a density relatively positive, while one or more possesses a density relatively negative with respect to the density of the mass treated.

2. A process for obtaining certain albuminous and fatty matters from products of animal or vegetable origin which consists in adding toluene and chloroform to such products, and subjecting such mixture to autolysis.

3. A process for obtaining certain albuminous and fatty matters from products of animal or vegetable origin which consists in adding 10 per thousand by weight of toluene and a like weight of chloroform to such products, and subjecting such mixture to autolysis.

In testimony whereof I affix my signature.

MAURICE KAHN.